April 22, 1947. S. ELIOT 2,419,489
MOTOR VEHICLE SNOW PLOW
Filed Aug. 18, 1944
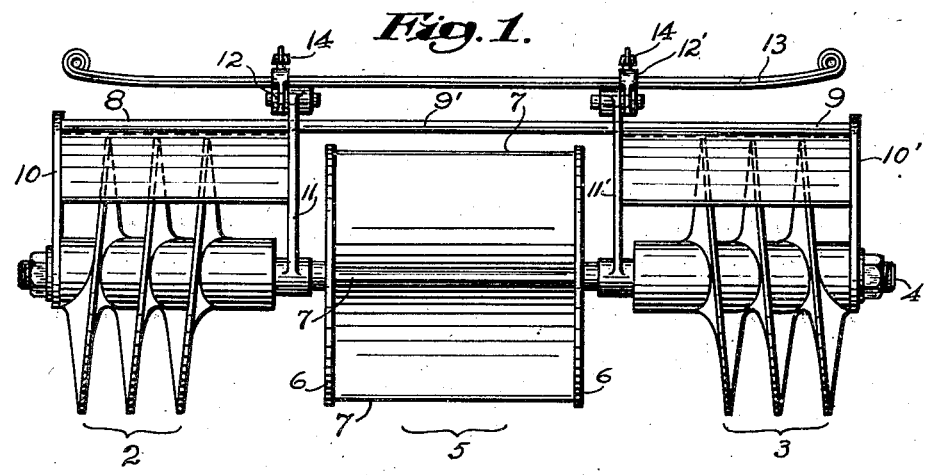
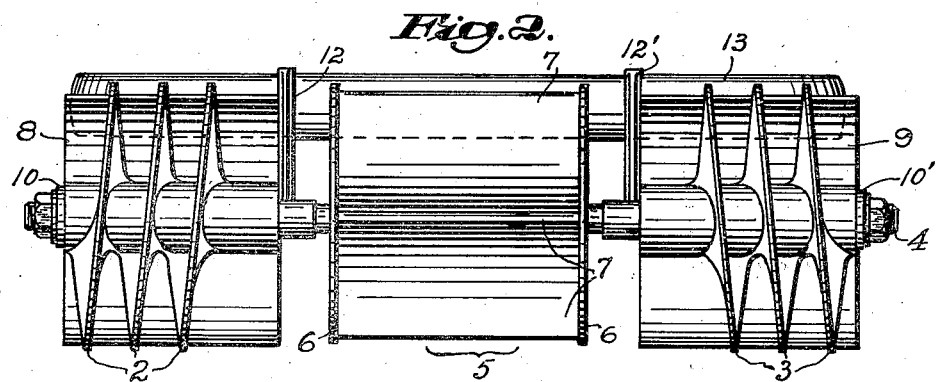
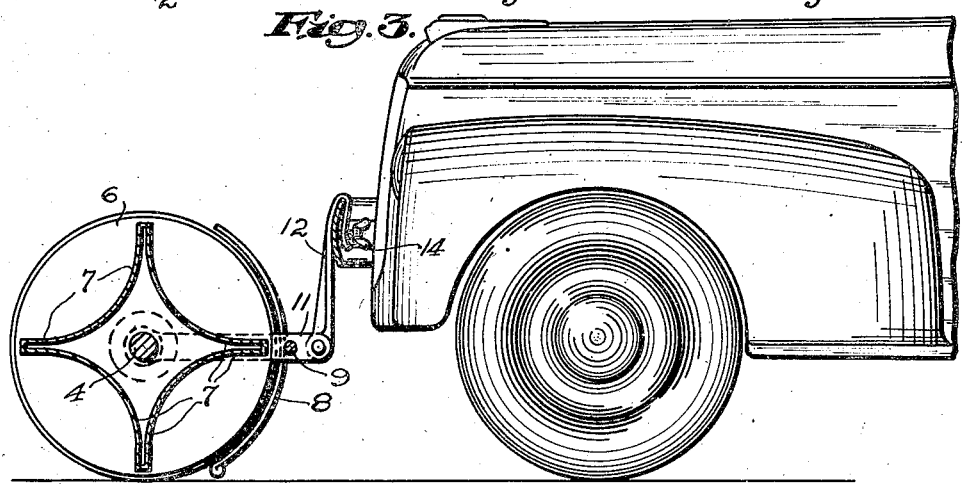

Patented Apr. 22, 1947

2,419,489

UNITED STATES PATENT OFFICE 2,419,489

MOTOR VEHICLE SNOW PLOW

Samuel Eliot, Newton, Mass.

Application August 18, 1944, Serial No. 549,999

6 Claims. (Cl. 37—43)

In those regions subject to heavy snow fall, it is often a difficult matter for a resident living some distance from a plowed highway to reach that highway by motor vehicle, without himself doing considerable shoveling or plowing. The present invention deals especially with this problem, and it aims to devise a simple but thoroughly practical solution for it.

The nature of the invention will be readily understood from the following description when read in connection with the accompanying drawings, and the novel features will be particularly pointed out in the appended claims.

In the drawings:

Fig. 1 is a plan view of a snow plow attachment for a motor vehicle constructed in accordance with this invention;

Fig. 2 is a front elevation of the attachment shown in Fig. 1; and

Fig. 3 is a side elevation, partly in section, illustrating the manner in which said attachment is releasably secured to the front bumper of an automobile.

The construction shown in the drawings comprises two spiral or screw impellers indicated, respectively, at 2 and 3, both of which are secured rigidly on the opposite end portions of a shaft 4. Also mounted on this shaft between the impellers is a drum 5 comprising two circular end disks 6—6 welded, or otherwise rigidly secured, to the opposite ends of a series of blades 7. As shown in Fig. 3, this entire drum may be made of sheet metal sections, the blades consisting of four curved plates with their longitudinal edges welded together to form four blades and their end edges welded to the plates 6—6. This drum is rigidly secured to the shaft. Associated with the two impellers are two stiff sheet metal guards or scoops indicated at 8 and 9, respectively, each having approximately the shape of a section of a cylindrical surface and each partially encircling, and lying closely adjacent to, the peripheral surface of its respective impeller at the rear side thereof. Preferably these guards are secured together by a bar 9', and this bar is fastened securely to two outside links 10 and 10' and also to two inside links 11 and 11', respectively. At their forward ends both sets of links loosely encircle the shaft 4 but the rear ends of the links 11 and 11' are pivoted to two hangers 12 and 12', each of which is provided at its upper end with an elongated hook portion adapted to fit over the bumper 13 of a motor vehicle and to be releasably secured thereto in any convenient manner as, for example, by the thumb screws 14—14, Figs. 1 and 3. The four links above mentioned and the bar 9' form a frame which holds the operating elements in cooperative relationship to each other.

This entire assembly is manufactured as a complete unit so that it may be quickly installed on, or removed from, the motor vehicle. When so installed the two impellers are positioned directly in front of the respective front wheels of said vehicle with their median vertical planes approximately in line with those of the respective wheels so that as the vehicle moves forward and the drum 5 is revolved by its contact with the snow, or with any other material in the roadway, it revolves both impellers. Such rotation causes them to force the snow axially in opposite directions away from each other and out of the path of the wheels of the vehicle which are following them. Removal of the snow is additionally facilitated by the presence of the guards 8 and 9 which act as scoops, the snow piling up against them as they are moved forward. It is then pushed in opposite directions away from the drum by the impellers, these parts cooperating with the guards to form, in effect, short sections of screw conveyors.

Preferably the end disks 6—6 of the drum 5 project slightly below the edges of the blades 7 and they may either run in contact with the road surface or be lifted somewhat away from it, depending upon the depth of the snow. In any event, the drum is revolved by its contact with the snow as the vehicle advances and the rotation thus imparted to it is depended upon primarily to drive the spiral impellers 2 and 3. The peripheral surfaces of these members and that of the drum are on approximately the same level, although it may be found desirable to make the impellers slightly larger in diameter than the drum, both to accommodate the crowning of the road and also for more efficient snow removal action of the impellers. The fact, however, that all three of the revolving members 2, 3 and 5 rotate around a common axis, and that the sub-assembly of which they form the greater part is hinged to the lower ends of the hangers 12—12', causes them to follow the road closely.

Thus the invention provides a snow plowing mechanism which can be manufactured economically, can be quickly and conveniently attached to, and removed from, a motor vehicle, and which performs very effectively in plowing out a road to that extent necessary for the passage of said vehicle. Also, it requires no transmission of power from the power plant of the motor vehicle itself because it derives such power as it requires solely from the movement of that vehicle over the road.

While I have herein shown and described a preferred embodiment of my invention, it will be evident that the invention may be embodied in other forms without departing from the spirit or scope thereof.

Having thus described my invention, what I desire to claim as new is:

1. A snow plow attachment for a motor vehicle, comprising two rotary spiral impellers operable to force the snow laterally in opposite directions away from each other out of the path of the front wheels of said vehicle, a shaft on which said impellers are mounted, supporting means for said shaft and said impellers comprising hangers adapted to be hooked over the front bumper of a motor vehicle and links pivotally connecting said hangers with said shaft, and driving means for said impellers comprising a rotary drum mounted on said shaft to revolve around the axis thereof and provided with blades to engage the snow in the roadway between said impellers, whereby said drum will be revolved by such engagement as the vehicle moves forward.

2. A snow plow attachment for motor vehicles according to preceding claim 1, including guards curved about the rearward portions of the peripheral surfaces of said respective impellers, and means connecting said guards with said shaft and said hangers to support the guards in their operative positions.

3. The combination with a motor vehicle provided with a front bumper, of a snow removal apparatus comprising a frame, two rotary snow impellers supported on said frame and mounted, respectively, in front of the two front wheels of the vehicle and operative to force the snow laterally out of the roadway in front of said wheels, means arranged to be driven by contact with material in the roadway between said impellers for revolving both of the latter, and hangers removably secured to said bumper and supporting said frame in its operative position in front of the vehicle.

4. The combination with a motor vehicle, of a snow removal apparatus comprising a frame, two rotary spiral snow impellers supported on said frame and mounted for rotation about a common horizontal axis in front of the two front wheels of the vehicle and operative to force the snow laterally out of the roadway in front of said wheels, means removably supporting said frame on the forward end of said vehicle and holding both of said impellers at a fixed distance in front of the vehicle but permitting them to move vertically relatively to said vehicle, a driving drum connected with said impellers to revolve them about said axis, said frame including bearing members supporting said drum for engagement with the snow between said front wheels whereby said drum will be revolved by the forward motion of said vehicle.

5. A snow plow attachment for a motor vehicle, comprising two rotary impellers operable by their rotation to force the snow laterally in directions away from each other out of the path of the front wheels of said vehicle, means supporting said impellers and adapted to be removably secured on the forward part of a motor vehicle, driving means for said impellers comprising a rotary device positioned to engage the snow in the roadway between said impellers and to be revolved by such engagement as the vehicle moves forward, and two guards mounted immediately behind said respective impellers and each curved around, and lying close to, the peripheral surfaces of the respective impellers at the rearward sides thereof where they cooperate with said impellers to discharge the snow laterally in opposite directions.

6. A snow plow attachment for a motor vehicle, comprising two rotary spiral impellers operable by their rotation to force the snow laterally in directions away from each other out of the path of the front wheels of said vehicle, means supporting said impellers for rotation in vertical planes generally parallel to the direction of movement of the vehicle, said means supporting said impellers removably on the forward part of said motor vehicle, and driving means for said impellers comprising a rotary device positioned to engage the snow in the roadway between the impellers and provided with blades extending transversely to the direction of motion of the vehicle and adapted to be revolved by their engagement with the snow as the vehicle moves forward.

SAMUEL ELIOT.

REFERENCES CITED

The following references are of record in the file of this patent:

UNITED STATES PATENTS

| Number | Name | Date |
| --- | --- | --- |
| 446,326 | Chambers | Feb. 10, 1891 |